(12) United States Patent
Kuznia et al.

(10) Patent No.: US 7,497,124 B2
(45) Date of Patent: Mar. 3, 2009

(54) DUAL PRESSURE SENSOR APPARATUS

(75) Inventors: Philip D. Kuznia, Carmel, IN (US);
Timothy A. Vas, Kokomo, IN (US);
Derek A. Delrymple, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/788,470

(22) Filed: Apr. 20, 2007

(65) Prior Publication Data

US 2008/0257052 A1 Oct. 23, 2008

(51) Int. Cl.
*G01L 7/00* (2006.01)
(52) U.S. Cl. ...................................... 73/714
(58) Field of Classification Search ........... 73/700–756; 361/283.1–283.4
See application file for complete search history.

(56) References Cited

U.S. PATENT DOCUMENTS

| | | | |
|---|---|---|---|
| 4,131,088 A | | 12/1978 | Reddy |
| 4,160,600 A | * | 7/1979 | Luke .......................... 356/506 |
| 4,222,277 A | * | 9/1980 | Kurtz et al. ................... 73/721 |
| 4,287,501 A | * | 9/1981 | Tominaga et al. ............. 338/42 |
| 4,975,390 A | * | 12/1990 | Fujii et al. ..................... 438/53 |
| 5,471,884 A | * | 12/1995 | Czarnocki et al. ............. 73/720 |
| 6,023,978 A | * | 2/2000 | Dauenhauer et al. .......... 73/720 |
| 6,564,642 B1 | * | 5/2003 | Clifford ....................... 73/718 |
| 6,581,468 B2 | * | 6/2003 | Clifford ....................... 73/715 |
| 7,107,854 B1 | * | 9/2006 | Czarnocki .................... 73/720 |

* cited by examiner

*Primary Examiner*—Andre J Allen
*Assistant Examiner*—Jermaine Jenkins
(74) *Attorney, Agent, or Firm*—Jimmy L. Funke

(57) ABSTRACT

A dual pressure sensor apparatus configured for attachment to a manifold includes a molded plastic housing with a body portion featuring an upper cavity, a measurement port, and a lower cavity closed by the manifold. First and second pressure sensor modules are mounted in first and second wells formed in the upper cavity, and electrically coupled to a set of leadframe terminals disposed in the upper cavity. An opening in the first well couples the first pressure sensor module to the measurement port, and an opening in the second well couples the second pressure sensor module to the lower cavity. The measurement port sealingly extends through an opening in the manifold so that the first pressure sensor module measures pressure in the manifold, and the body portion walls bounding the lower cavity are notched so that the second pressure sensor module measures atmospheric or barometric pressure outside the manifold.

3 Claims, 4 Drawing Sheets

DUAL PRESSURE SENSOR APPARATUS

TECHNICAL FIELD

The present invention relates to sensor arrangements for facilitating the control of an internal combustion engine, and more particularly to a dual pressure sensor apparatus for measuring both manifold absolute pressure and barometric pressure.

BACKGROUND OF THE INVENTION

Manifold absolute pressure (MAP) and barometric pressure (BARO) are frequently measured for engine control purposes. Ordinarily, a separate pressure sensor module is used to measure each pressure, the MAP sensor being mounted on the intake manifold and the BARO sensor being mounted elsewhere in the engine compartment. While it has long been recognized that it is possible to mount both MAP and BARO sensors in one package for lower overall sensor cost (see, for example, the U.S. Pat. No. 4,131,088 to Reddy), widespread usage of dual pressure sensors has not occurred. Accordingly, what is needed is an improved approach to dual pressure sensing.

SUMMARY OF THE INVENTION

The present invention provides an improved dual pressure sensor apparatus for attachment to a manifold, the sensor apparatus including a molded plastic housing with a body portion featuring an upper cavity, a measurement port, and a lower cavity closed by the manifold. First and second pressure sensor modules are mounted in first and second wells formed in the upper cavity, and electrically coupled to a set of leadframe terminals disposed in the upper cavity. An opening in the first well couples the first pressure sensor module to the measurement port, and an opening in the second well couples the second pressure sensor module to the lower cavity. The measurement port sealingly extends through an opening in the manifold so that the first pressure sensor module measures pressure in the manifold, and the body portion walls bounding the lower cavity are notched so that the second pressure sensor module measures atmospheric or barometric pressure outside the manifold.

DESCRIPTION OF THE PREFERRED EMBODIMENT

The sensor apparatus of the present invention is disclosed herein in the context of an engine control sensor that measures both MAP and BARO as discussed above. However, it will be recognized that the described dual pressure sensor apparatus can be extended to applications in which the manifold-confined pressure is something other the pressure in the intake manifold pressure of an engine. As such, the term "manifold" as used herein can be more generally understood to designate the wall of a vessel per se.

Figure 1:
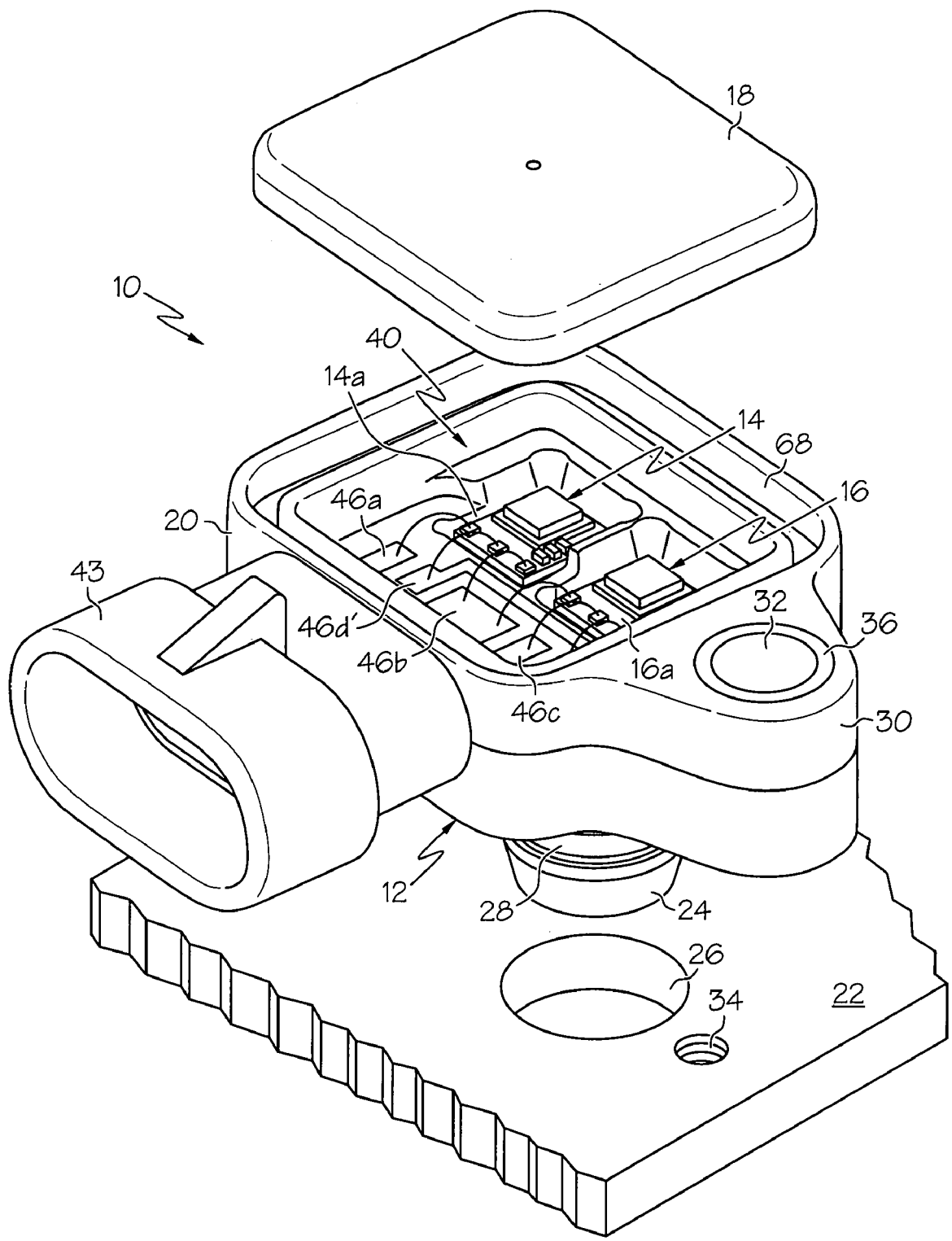
FIG. 1 is a partially exploded upper isometric view of the dual pressure sensor apparatus of the present invention, including a housing, two pressure sensor modules and a cover.
Figure 2:
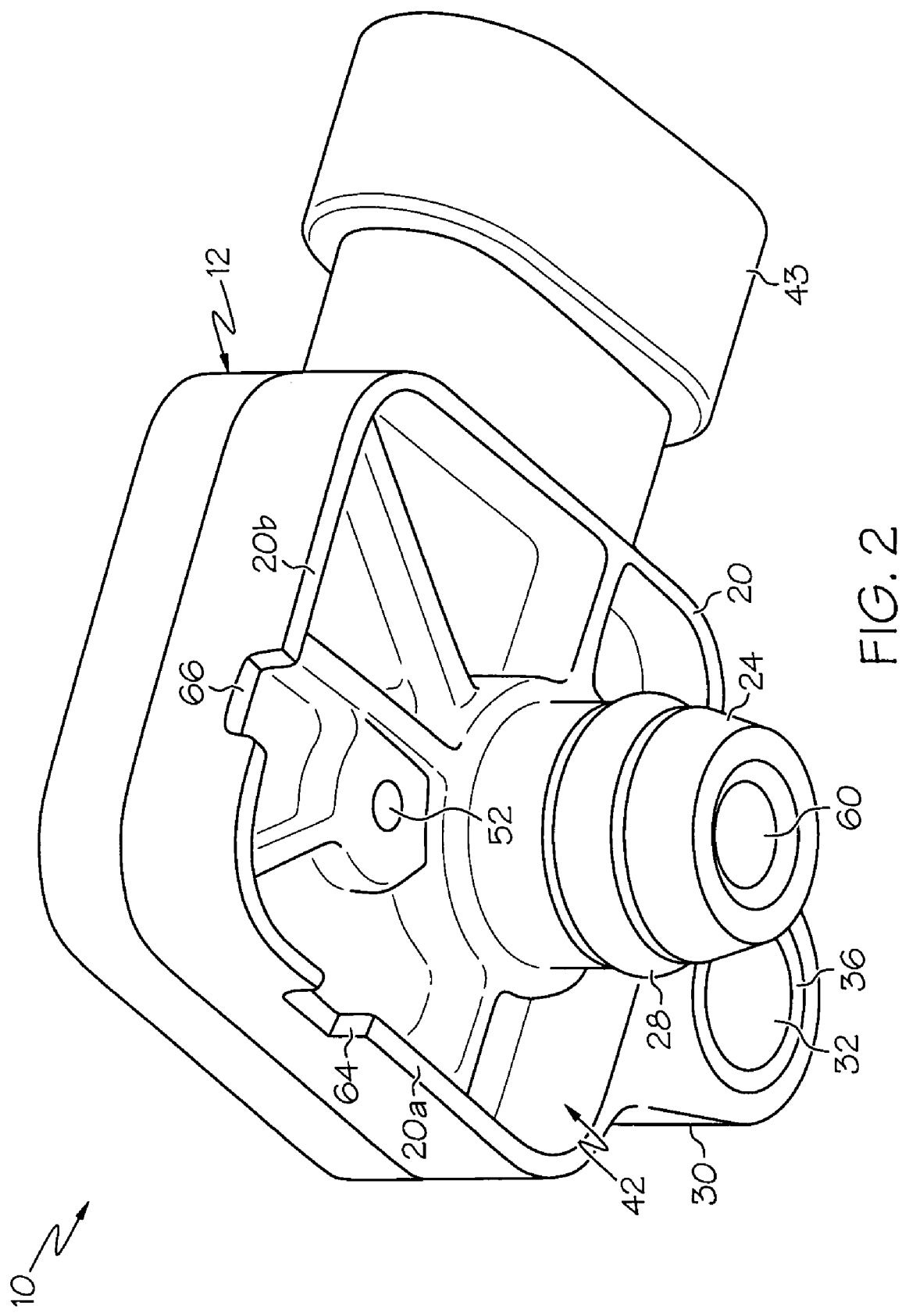
FIG. 2 is a lower isometric view of the sensor apparatus of FIG. 1.

Referring to FIGS. 1 and 2, the reference numeral 10 generally designates a preferred embodiment of a dual pressure sensor apparatus that measures both MAP and BARO for the control of an internal combustion engine. The sensor apparatus 10 includes a molded plastic housing 12, first and second electronic pressure sensor modules 14 and 16 and a plastic cover 18. The pressure sensor modules 14, 16 are identical; each includes a pressure sensor element and signal processing chip(s) mounted on a ceramic substrate 14a, 16a. The molded housing 12 includes a generally rectangular body portion 20 that abuts the engine's intake manifold 22 and a MAP measurement port 24 that extends through a smooth opening 26 formed in the manifold 22 so that the outboard end of the measurement port 24 is disposed in the air stream within the manifold 22. An O-ring 28 surrounding the measurement port 24 is compressed between the measurement port 24 and the periphery of the manifold opening 26 to prevent leakage into or out of the manifold 22.

One side of the housing body portion 20 bulges laterally outward to form a mounting lug 30 for securing the sensor apparatus 10 to the manifold 22. The lug 30 is provided with an opening 32 for receiving a mounting bolt (not shown) that threads into a tapped manifold opening 34 adjacent the opening 26, and a metal bushing 36 insert-molded in the lug opening 32 bears the compressive force of the mounting bolt.

Figure 3:
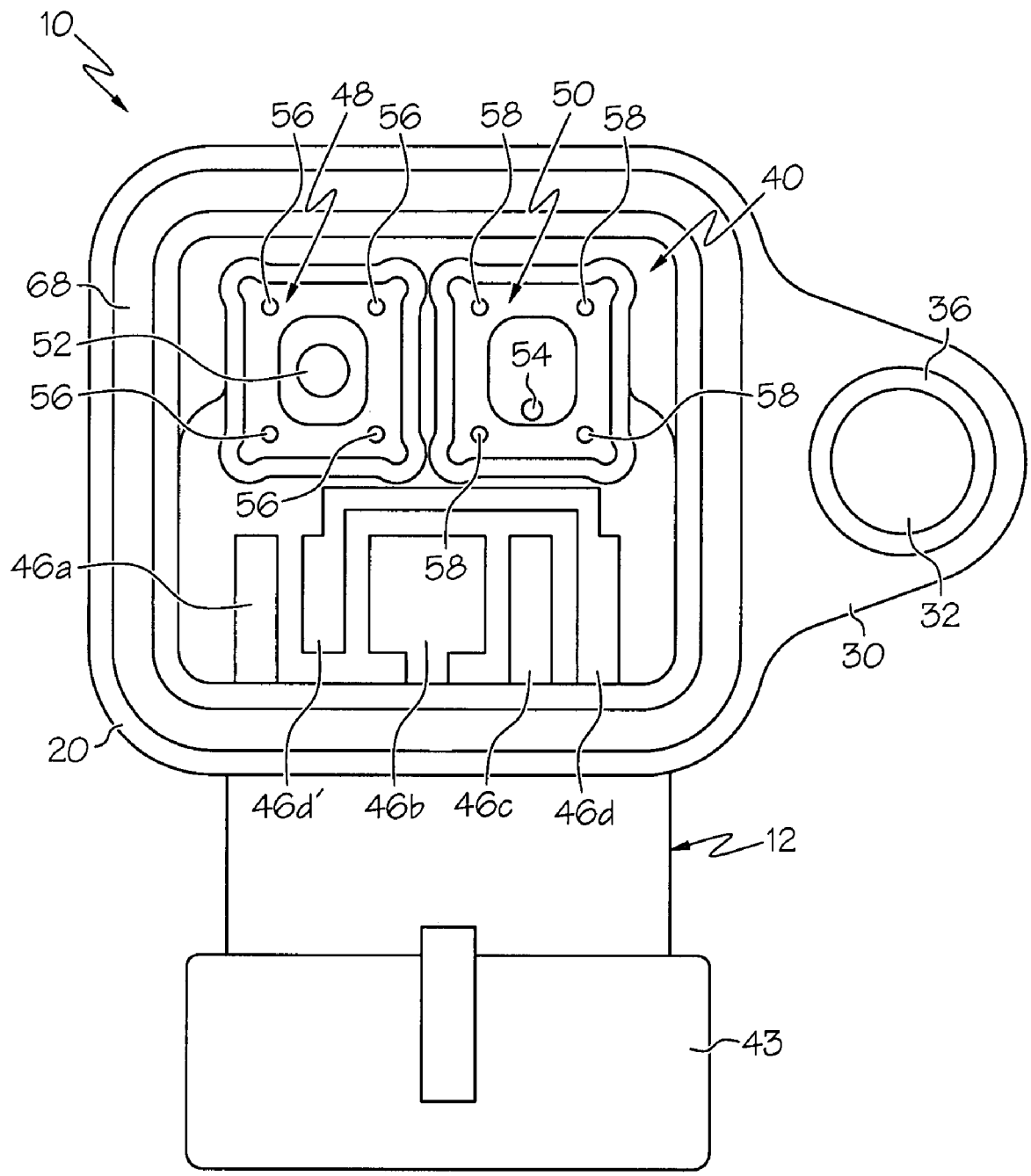
FIG. 3 is a top view of the sensor apparatus housing of FIG. 1, without the pressure sensor modules and the cover.
Figure 4:
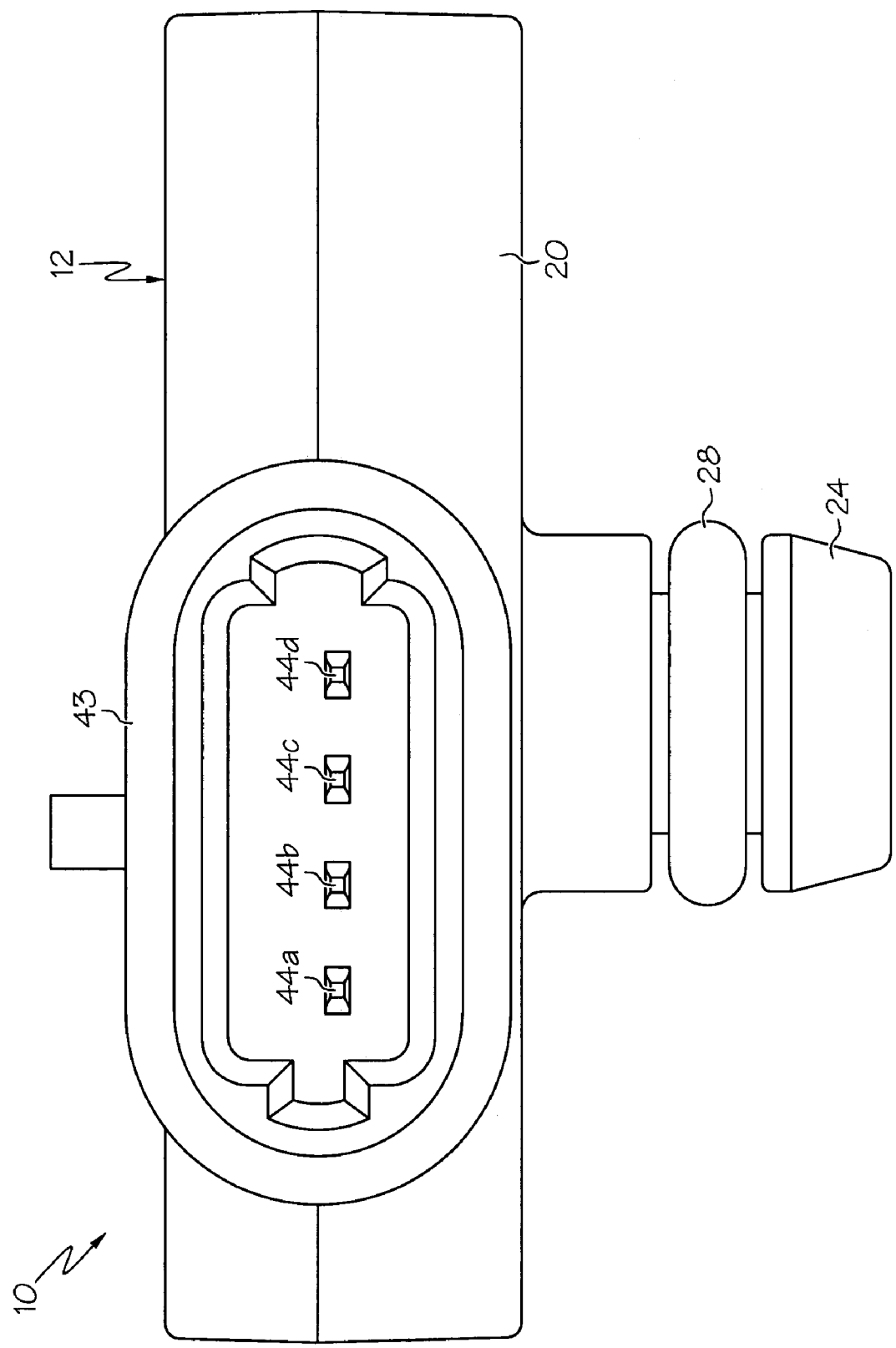
FIG. 4 is an end view of the sensor apparatus housing of FIG. 1, without the cover.

The body portion 20 of sensor housing 12 additionally includes an upper cavity 40 (that is, a cavity that opens away from the manifold 22), a lower cavity 42 (that is, a cavity that opens toward the manifold 22) closed by the manifold 22, and a connector hood 43. The connector hood 43 is designed to mate with a complementary connector (not shown), and a set of four leadframe terminals 44a, 44b, 44c, 44d insert-molded in the sensor housing 12 extend into the connector hood 43 as seen in FIG. 4. As best seen in FIG. 3, the inboard ends of the terminals 44a, 44b, 44c, 44d terminate in a linear array of bond pads 46a, 46b, 46c, 46d on the floor of the upper cavity 40 adjacent the connector hood 43. Also, two individual sensor wells 48 and 50 are formed in the floor of upper cavity 40 adjacent the terminal bond pads 46a, 46b, 46c and 46d.

Referring to FIGS. 1 and 3, the pressure sensor module 14 is secured in the sensor well 48 with a peripherally dispensed adhesive, and the pressure sensor module 16 is similarly secured in the sensor well 50. The sensor wells 48, 50 each include a central opening 52, 54 and a set of peripheral standoff bumps 56, 58 that support the respective pressure sensor module substrate 14a, 16a. The standoff bumps 56, 58 help ensure that the peripheral adhesive between the substrates 14a, 16a and the floor of the respective sensor well 48, 50 will have a uniform thickness for optimal adhesion and sealing. The central opening 54 formed in the floor of sensor well 50 opens into a central bore 60 in the measurement port 24 so that the pressure sensor element of sensor module 16 is responsive to the pressure within the manifold 22 (i.e., MAP). The central opening 52 formed in the floor of sensor well 48 opens into the lower cavity 42 of body portion 12, as seen in FIG. 2, so that the pressure sensor element of sensor module 14 is responsive to the pressure within the lower cavity 42. The lower cavity 42 is laterally bounded by the sidewalls 20a and 20b of the housing body portion 20, and a pair of peripheral notches 64, 66 in the sidewalls 20a, 20b open the lower cavity 42 to atmospheric air (i.e., barometric pressure) when the sensor apparatus 10 is secured to manifold 22 as described above in respect to FIG. 1.

Once the pressure sensor modules 14 and 16 are mounted in the respective sensor wells 48 and 50, the sensor modules 14 and 16 are electrically coupled to the terminal bond pads 46a-46d by wirebonding. As seen in FIG. 1, the sensor module 14 is wire-bonded to the terminal bond pads 46a, 46d and 46b; and the sensor module 16 is wire-bonded to the terminal bond pads 46b, 46c and 46d. The common bond pad 46b supplies operating voltage (power) to sensor modules 14 and 16, and the common bond pad 46d supplies a common ground reference to sensor modules 14 and 16. The common bond pad 46b is disposed between the sensor modules 14, 16, and the common bond pad 46d is provided with a lateral trace 46d' to minimize the length of the wirebond between it and the sensor module 14. The bond pad 46a and corresponding terminal 44a convey the pressure measurement of sensor module 14 to an engine control module (not shown), and the bond pad 46d and corresponding terminal 44d similarly convey the pressure measurement of sensor module 16. Once the wirebond connections have been formed, a sealant or passivating compound (not shown) such as silicone is dispensed into the upper cavity 40, and the cover 18 is pressed or glued into a channel 68 surrounding the upper cavity 40.

In summary, the present invention achieves an easily implemented and very cost effective approach to dual pressure sensing. While the present invention has been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. Dual pressure sensing apparatus comprising:
   a molded plastic housing with a body portion featuring an upper cavity, a measurement port that sealingly extends through an opening in a manifold to which the housing is attached, and a lower cavity partially closed by the manifold, where a wall of the body portion bounding the lower cavity is notched to vent the lower cavity to barometric pressure outside the manifold;
   first and second pressure sensor modules mounted in first and second wells formed in the upper cavity;
   a first opening in the first well for coupling the first pressure sensor module to the measurement port so that the first pressure sensor module measures pressure in the manifold; and
   a second opening in the second well for coupling the second pressure sensor module to the lower cavity so that the second pressure sensor module measures barometric pressure outside the manifold.

2. The dual pressure sensing apparatus of claim 1, further comprising:
   a set of leadframe terminals insert molded in the housing, including an array of terminal bond pads on a floor of the upper cavity; and
   a set of wirebonds coupling the first and second pressure sensor modules to the terminal bond pads.

3. The dual pressure sensing apparatus of claim 1, further comprising:
   a cover closing said upper cavity.

\* \* \* \* \*